May 6, 1930.  J. SURBER  1,757,271

PUMP PISTON

Filed Nov. 2, 1929

INVENTOR
John Surber
BY Westall and Wallace
ATTORNEYS

Patented May 6, 1930

1,757,271

UNITED STATES PATENT OFFICE

JOHN SURBER, OF WHITTIER, CALIFORNIA

PUMP PISTON

Application filed November 2, 1929. Serial No. 404,308.

This invention relates to a piston assembly especially adapted for pumps. Pumps which move liquid containing abrasive materials, such as mud used in oil well drilling operations are subject to rapid wear of the piston packing and any metallic piston elements which slidably ride against the cylinder wall during working of the pump.

The present invention has for its principal object the provision of a piston assembly wherein the metallic piston elements for supporting the packing are shielded from abrasive material. Another object of this invention is to provide a piston assembly wherein the packing is substantially coextensive with the rubbing surface of the piston. A further object of this invention is to provide a piston assembly having a minimum of parts easy to assemble and in which the packing elements are interchangeable. A still further object of this invention is to provide a piston assembly wherein the packing on the working side of the piston is expanded by compression against the cylinder wall and having lips to wipe abrasive particles from the cylinder wall and to seal the packing on its inner side. In addition to the broader objects of this invention, there are certain details of design contributing to simplicity, economy of construction and ease of replacement of parts.

These objects together with other objects and corresponding accomplishments are obtained by means of the embodiment of my invention illustrated in the accompanying drawing, in which:—

Figure 1:
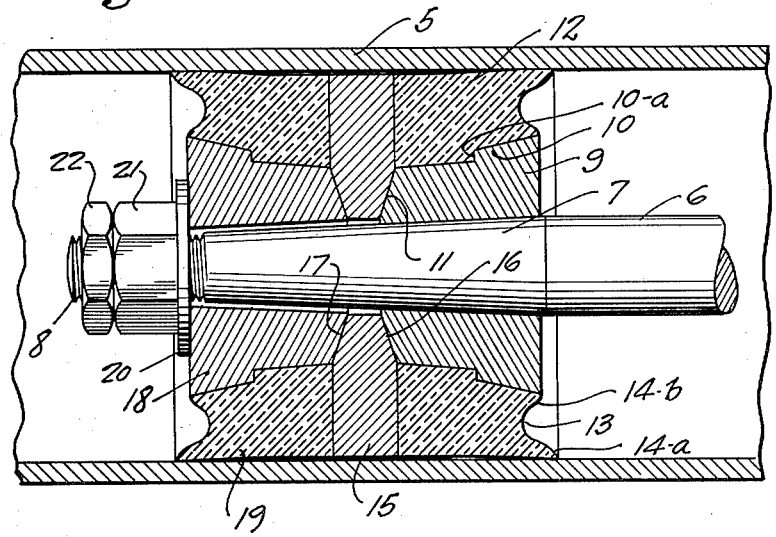
Figure 2:
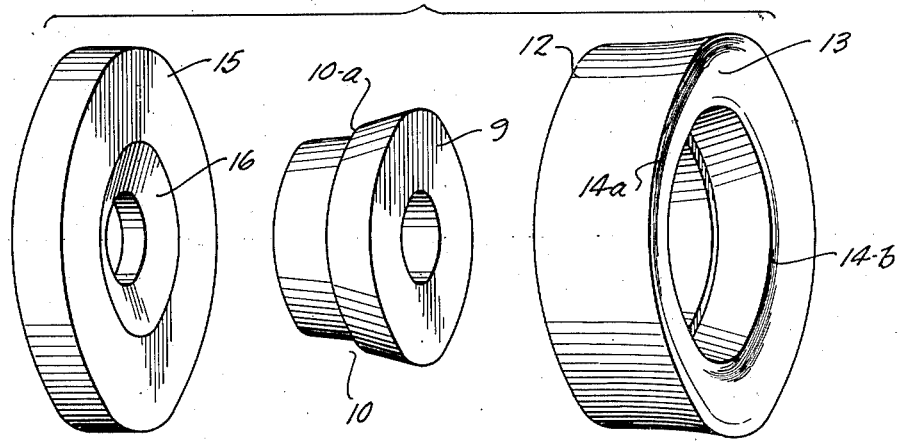

Fig. 1 is an axial section through a fragment of a cylinder and my piston assembly; Fig. 2 shows perspective views of a packing ring, a core block and the disk.

Referring more particularly to the drawing, 5 marks a cylinder. Within the cylinder is a piston, which in this instance is for a double acting pump. The piston assembly comprises a piston rod 6 having a tapered inner end 7 and a reduced threaded end 8. The tapered end 7 forms an abutment surface for the piston rod elements, as will be later described. Mounted upon the tapered portion 7 of the piston rod is a core block 9 of a rigid material such as iron or steel. The core block has a bore with a taper corresponding to the taper of the rod. Its periphery is tapered as indicated by 10 and an annular shoulder 10$^a$ is provided. At its small end is a projection 11. Mounted over the core block 9 is a packing ring 12 of elastic material, such as rubber. This ring has an outer cylindrical surface for rubbing engagement with the wall of cylinder 5. It is provided with an annular recess 13 forming a cup lip 14$^a$ and a lip 14$^b$. Disposed at the small end of the core block is a metallic disk 15. Disk 15 is slipped over the rod and has a socket 16 corresponding to the projection 11 of the core block so that the latter may rest therein. This provides for maintaining the disk 15 in alinement as the bore thereof is larger than the piston rod as will be noted from Fig. 1. Disk 15 is symmetrical and has a socket 17 opposite to socket 16. Mounted on the piston rod and on the other side of the disk is a core block 18 having a tapered outer surface corresponding to the tapered surface 10 of core block 9. The core blocks are mounted with their small ends facing one another and with their projections disposed in the sockets on disk 15. Mounted over core block 18 is a rubber ring 19 substantially a duplicate of the rubber ring 12. A washer 20 is interposed between core block 18 and a nut 21 to hold the core blocks in position. Lock nut 22 holds nut 21 upon the threaded end of the piston rod.

In assembling the piston, core block 9 is slipped into position, then a rubber ring is mounted over the core block. Next the disk 15 is placed over the rod to abut the core block and rubber ring. Rubber ring 19 is now placed over the rod and core block 18 inserted in the bore of ring 19. The washer 20 and nuts 21 and 22 are now mounted on the rod to clamp the piston elements in position.

In operation of the piston, pressure on the working side of the piston will cause compression of the packing ring on that side, forcing the packing ring against the wall of the cylinder to provide a leak tight fit. The disk 15 serves as a seat against which the packing ring is forced. The lip 14$^a$ of the packing ring will be pressed against the cylinder wall in the manner of a cup leather formed to wipe the wall of any abrasive particles. Lip 14ᵇ causes the ring to be forced against the core block to form a leak tight fit and prevent fluid from passing between the ring and rod. It will be noted that there are no rubbing metallic parts, the disk 15 being small enough to clear the cylinder wall. Furthermore abrasive particles are wiped from the cylinder wall by the outer lips of the packing rings and prevented from moving to the central part of the assembly. The inner lips are forced against the core blocks to provide a leak tight fit. Thus, liquid can not pass around the piston. The packing ring on the working side takes all the load so that each packing ring takes only one half of the total load for a complete stroke. Since the rubber rings are duplicates, a minimum of parts which are subject to wear are required. Assembly and disassembly of parts may be effected with a minimum of labor.

What I claim is:—

1. A piston assembly comprising a piston rod having an abutment surface at its inner end, core blocks with tapering peripheral surfaces mounted on said rod with their small ends facing one another, the inner of said blocks having an abutment surface cooperating with the abutment surface on the piston rod to position the block against outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod.

2. A piston assembly comprising a piston rod having an abutment surface at its inner end, core blocks with tapering peripheral surfaces mounted on said rod with their small ends facing one another, the inner of said blocks having an abutment surface cooperating with the abutment surfaces on the piston rod to position the block against outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod, said rings being formed with annular cup lips on their outer end faces.

3. A piston assembly comprising a piston rod having an abutment surface at its inner end, core blocks with tapering peripheral surfaces mounted on said rod with their small ends facing one another, the inner of said blocks having an abutment surface cooperating with the abutment surface on the piston rod to position the block against outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod, said rings being formed with annular recesses in their outer end faces to form annular lips.

4. A piston assembly comprising a piston rod having an abutment surface at its inner end, core blocks with tapering peripheral surfaces mounted on said rod with their small ends facing one another, the inner of said blocks having an abutment surface cooperating with the abutment surface on the piston rod to position the block against outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod, said core blocks and disk having engaging sockets and projections on their contiguous faces to interlock.

5. A piston assembly comprising a piston rod having an abutment surface at its inner end, core blocks with tapering peripheral surfaces mounted on said rod with their small ends facing one another, the inner of said blocks having an abutment surface cooperating with the abutment surface on the piston rod to position the block against outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod, said rings being formed with annular cup lips on their outer end faces, said core blocks and disk having engaging sockets and projections on their contiguous faces to interlock.

6. A piston assembly comprising a piston rod having an abutment surface at its inner end, core blocks with tapering peripheral surfaces mounted on said rod with their small ends facing one another, the inner of said blocks having an abutment surface cooperating with the abutment surface on the piston rod to position the block against outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod, said rings being formed with annular recesses in their outer end faces to form annular cup lips, said core blocks and disk having engaging sockets and projections on their contiguous faces to interlock.

7. A piston assembly comprising a piston rod having a tapered inner end, core blocks with tapering peripheral surfaces mounted on said rod with their small ends facing one another, the inner of said blocks having a tapered bore corresponding to the tapered surface of the said rod and forming therewith cooperating abutment surfaces to position the block against the outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod.

8. A piston assembly comprising a piston rod having a tapered inner end, core blocks with tapering peripheral surfaces mounted on said rod with their small ends facing one another, the inner of said blocks having a tapered bore corresponding to the tapered surface of the said rod and forming therewith cooperating abutment surfaces to position the block against the outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod, said rings being formed with annular cup lips on their outer end faces.

9. A piston assembly comprising a piston rod having a tapered inner end, core blocks with tapering peripheral surfaces mounted on said rod with their small ends facing one another, the inner of said blocks having a tapered bore corresponding to the tapered surface of the said rod and forming therewith cooperating abutment surfaces to position the block against the outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod, said rings being formed with annular recesses in the outer end faces to form annular lips.

10. A piston assembly comprising a piston rod having a tapered inner end, core blocks with tapering peripheral surfaces mounted on said rod with their small ends facing one another, the inner of said blocks having a tapered bore corresponding to the tapered surface of the said rod and forming therewith cooperating abutment surfaces to position the block against the outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod, said core blocks and disk having engaging sockets and projections on their contiguous faces to interlock.

11. A piston assembly comprising a piston rod having a tapered inner end, core blocks with tapering peripheral surfaces mounted on said rod with their small ends facing one another, the inner of said blocks having a tapered bore corresponding to the tapered surface of the said rod and forming therewith cooperating abutment surfaces to position the block against the outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod, said rings being formed with annular cup lips on their outer end faces, said core blocks and disk having engaging sockets and projections on their contiguous faces to interlock.

12. A piston assembly comprising a piston rod having a tapered inner end, core blocks with tapering peripheral surfaces mounted on said rod with their small ends facing one another, the inner of said blocks having a tapered bore corresponding to the tapered surface of the said rod and forming therewith cooperating abutment surfaces to position the block against the outward movement on said rod, a disk interposed between said blocks and having its periphery substantially equal to the overall diameter of the piston, rings of elastic material closely fitted over the peripheries of said blocks and abutting said disk, and means to clamp the blocks and disk on said rod, said rings being formed with annular recesses in the outer end faces to form annular lips, said core blocks and disk having engaging sockets and projections on their contiguous faces to interlock.

13. A piston assembly comprising a piston rod having an abutment surface at its inner end, a core block with a tapering peripheral surface mounted on said rod with its small end adjacent the inner end of said rod, said block having an abutment surface cooperating with the abutment surface on the piston rod to position the block against outward movement on said rod, a disk engaging the small end of said block, a ring of elastic material closely fitted over the periphery of said block and abutting said disk, and means to clamp the block and disk on said rod.

14. A piston assembly comprising a piston rod having a tapered surface at its inner end, a core block with a tapering peripheral surface mounted on said rod with its small end towards the inner end of said rod, and a bore having a corresponding tapered wall fitting over said tapered surface to form abutment surfaces to position the block against outward movement on said rod, a disk engaging the small end of said block, a ring of elastic material closely fitted over the periphery of said block and abutting said disk, and means to clamp the block and disk on said rod.

In witness that I claim the foregoing I have hereunto subscribed my name this 19th day of October, 1929.

JOHN SURBER.